US007308716B2

(12) United States Patent
Danford et al.

(10) Patent No.: US 7,308,716 B2
(45) Date of Patent: Dec. 11, 2007

(54) APPLYING BLOCKING MEASURES PROGRESSIVELY TO MALICIOUS NETWORK TRAFFIC

(75) Inventors: Robert William Danford, Ashburn, VA (US); Kenneth M. Farmer, Manitou Springs, CO (US); Clark Debs Jeffries, Chapel Hill, NC (US); Robert B. Sisk, Chapel Hill, NC (US); Michael A. Walter, Denver, CO (US)

(73) Assignee: International Business Machines Corporation, Armonk, NY (US)

( * ) Notice: Subject to any disclaimer, the term of this patent is extended or adjusted under 35 U.S.C. 154(b) by 664 days.

(21) Appl. No.: 10/442,008

(22) Filed: May 20, 2003

(65) Prior Publication Data

US 2004/0236963 A1   Nov. 25, 2004

(51) Int. Cl.
G06F 15/08     (2006.01)
G08B 23/00     (2006.01)
(52) U.S. Cl. .................... 726/23; 726/25; 709/224
(58) Field of Classification Search .............. 726/2, 726/3, 4, 11, 21, 22, 23, 25, 26; 709/224, 709/225, 229
See application file for complete search history.

(56) References Cited

U.S. PATENT DOCUMENTS

| 5,557,742 | A | 9/1996 | Smaha et al. ............... 395/186 |
| 5,621,889 | A | 4/1997 | Lermuzeaux et al. ....... 395/186 |
| 5,991,881 | A | 11/1999 | Conklin et al. ............. 713/201 |
| 6,282,546 | B1 | 8/2001 | Gleichauf et al. .......... 707/102 |
| 6,301,668 | B1 * | 10/2001 | Gleichauf et al. ............ 726/25 |
| 6,321,338 | B1 * | 11/2001 | Porras et al. ................. 726/25 |
| 6,405,318 | B1 | 6/2002 | Rowland ..................... 713/200 |
| 6,460,141 | B1 * | 10/2002 | Olden ........................... 726/4 |

(Continued)

FOREIGN PATENT DOCUMENTS

JP    2001057554    2/2001

(Continued)

OTHER PUBLICATIONS

Raeth, P. et al. "Finding Events Automatically in Continuously Sampled Data Streams via Anomaly Detection", IEEE National Aerospace and Electronics conference (NAECON) Oct. 2000, pp. 580-587.

*Primary Examiner*—Emmanuel L. Moise
*Assistant Examiner*—Zachary A. Davis
(74) *Attorney, Agent, or Firm*—Schmeiser, Olsen & Watts; David R. Irvin; John R. Pivnichny

(57) ABSTRACT

A method of progressive response for invoking and suspending blocking measures that defend against network anomalies such as malicious network traffic so that false positives and false negatives are minimized. When an anomaly is detected, the detector notifies protective equipment such as a firewall or a router to invoke a blocking measure. The blocking measure is maintained for an initial duration, after which it is suspended while another test for the anomaly is made. If the anomaly is no longer evident, the method returns to the state of readiness. Otherwise, a loop is executed to re-applying the blocking measure for a specified duration, then suspend the blocking measure and test again for the anomaly. If the anomaly is detected, the blocking measure is re-applied, and its duration is adapted. If the anomaly is no longer detected, the method returns to the state of readiness.

10 Claims, 2 Drawing Sheets

U.S. PATENT DOCUMENTS

| | | | |
|---|---|---|---|
| 6,477,651 B1 | 11/2002 | Teal | 713/200 |
| 6,487,666 B1 | 11/2002 | Shanklin et al. | 713/201 |
| 6,530,024 B1 | 3/2003 | Proctor | 713/201 |
| 6,647,400 B1* | 11/2003 | Moran | 707/205 |
| 6,704,874 B1* | 3/2004 | Porras et al. | 726/22 |
| 6,775,657 B1* | 8/2004 | Baker | 706/45 |
| 7,017,186 B2* | 3/2006 | Day | 726/23 |
| 2002/0087882 A1 | 7/2002 | Schneier et al. | 713/201 |
| 2002/0101819 A1 | 8/2002 | Goldstone | 370/229 |
| 2003/0009699 A1* | 1/2003 | Gupta et al. | 713/201 |
| 2003/0043853 A1 | 3/2003 | Doyle et al. | 370/489 |
| 2003/0105976 A1* | 6/2003 | Copeland, III | 713/201 |
| 2003/0154399 A1* | 8/2003 | Zuk et al. | 713/201 |
| 2003/0188189 A1* | 10/2003 | Desai et al. | 713/201 |
| 2003/0236992 A1* | 12/2003 | Yami | 713/200 |
| 2004/0010718 A1* | 1/2004 | Porras et al. | 713/201 |
| 2004/0098623 A1* | 5/2004 | Scheidell | 713/201 |
| 2004/0117658 A1* | 6/2004 | Klaes | 713/201 |
| 2004/0205360 A1* | 10/2004 | Norton et al. | 713/201 |
| 2005/0044406 A1* | 2/2005 | Stute | 713/201 |
| 2006/0117386 A1* | 6/2006 | Gupta et al. | 726/23 |

FOREIGN PATENT DOCUMENTS

| | | | |
|---|---|---|---|
| JP | 2002252654 | | 9/2002 |
| WO | WO 0116708 | * | 3/2001 |
| WO | WO0225402 | | 3/2002 |

* cited by examiner

APPLYING BLOCKING MEASURES PROGRESSIVELY TO MALICIOUS NETWORK TRAFFIC

FIELD OF THE INVENTION

The present invention is related to the field of networking, and more particularly to the field of protecting network-connected equipment from damage caused by malicious network traffic.

BACKGROUND

Internet-based communication is now frequently subject to electronic vandalism. As the sophistication of measures intended to combat such vandalism grows, new forms of vandalism appear. For example, a worm known as W32.SQLExp.Worm, or more simply as the Slammer Worm, appeared in late January, 2003. The Slammer Worm inflicted damage upon its victims by sending 376-byte packets to UDP port 1434, which is the SQL Server Resolution Server Port, and in effect provided a Denial of Service attack. One highly damaging attribute of the Slammer Worm was its unprecedented rate of growth and propagation, reportedly doubling itself every 8.5 seconds.

Such extreme forms of vandalism exceed the capabilities of known defensive mechanisms, sometimes even turning the defensive mechanisms themselves into Pyrrhic exercises that are accompanied by so many unintended consequences as to make their benefits questionable. For example, to combat the Slammer Worm, all traffic that includes UDP port 1434 in a source or destination address may simply be blocked. Unfortunately, this disrupts any flow of legitimate traffic that happens to include the same identification. Perhaps more troublesome, any appearance of legitimate traffic for UDP 1434 may trigger defensive measures even in the absence of the Slammer Worm.

Instances of invoking defensive measures in the absence of an intended trigger may generally be called false positives. Conversely, failing to recognize an intended trigger, or allowing any substantial delay once a trigger is detected, may permit fact-acting agents of vandalism such as the Slammer Worm to inflict severe damage before being brought under control. Such instances of failing to invoke defensive measures in the presence of an intended trigger may generally be called false negatives.

To combat rapidly propagating agents of vandalism such as the Slammer Worm, there is a need for an improved method of applying measures that defend against malicious traffic, where the improved method has a low rate of false positives, so that legitimate traffic unrelated to vandalism is not blocked, and also has a low rate of false negatives, so that fast-acting agents of vandalism are not allowed to inflict significant damage before they are blocked.

SUMMARY OF THE INVENTION

The present invention includes a method of progressive response that applies and suspends blocking measures for an adaptive duration to defend against network anomalies such as malicious network traffic, in a way that minimizes the adverse consequences of false positives and false negatives.

The method starts in a state of readiness to act, wherein a detector such as an Intrusion Detection Security System monitors for network anomalies. When an anomaly is detected, the detector notifies protective equipment such as a firewall or a router to apply a blocking measure against traffic that bears the distinguishing marks of malicious traffic. The blocking measure is maintained for an initial duration, after which it is suspended while another test is made to determine whether the anomaly is still evident. If the anomaly is no longer evident, the method returns to the state of readiness.

Otherwise, (i.e., the anomaly is still evident) the duration is adapted and the method begins to execute a loop. The loop includes the steps of re-applying the blocking measure for the duration, suspending the blocking measure at the end of the duration, and testing again for the anomaly while the blocking measure is suspended. Each time that the anomaly is detected during execution of the loop, the duration is again adapted, for example increased in accordance with a monotone non-decreasing function that may be subject to an upper bound which prevents the occurrence of extreme durations. The blocking measure is then re-applied for the newly specified duration. When a test indicates that the anomaly is no longer evident, the duration is again adapted by re-setting it to its initial value, and the method returns to the state of readiness where the blocking measure is not applied.

Thus, with the present invention, the blocking measure is applied quickly once malicious traffic is detected and maintained as long as a threat of malicious traffic is evident, thereby minimizing the adverse consequences of false negatives, and yet also suspended as quickly as possible, once the threat of malicious traffic has passed, thereby minimizing the adverse consequences of false positives, consistent with minimizing unproductive churning and response to mid-attack false negatives. These and other aspects of the present invention will be more fully appreciated when considered in light of the following detailed description and drawings.

DETAILED DESCRIPTION

The present invention provides a progressive response that applies and suspends blocking measures to defend against network anomalies such as malicious network traffic, in a way that minimizes the adverse consequences of false positives and false negatives.

Figure 1:
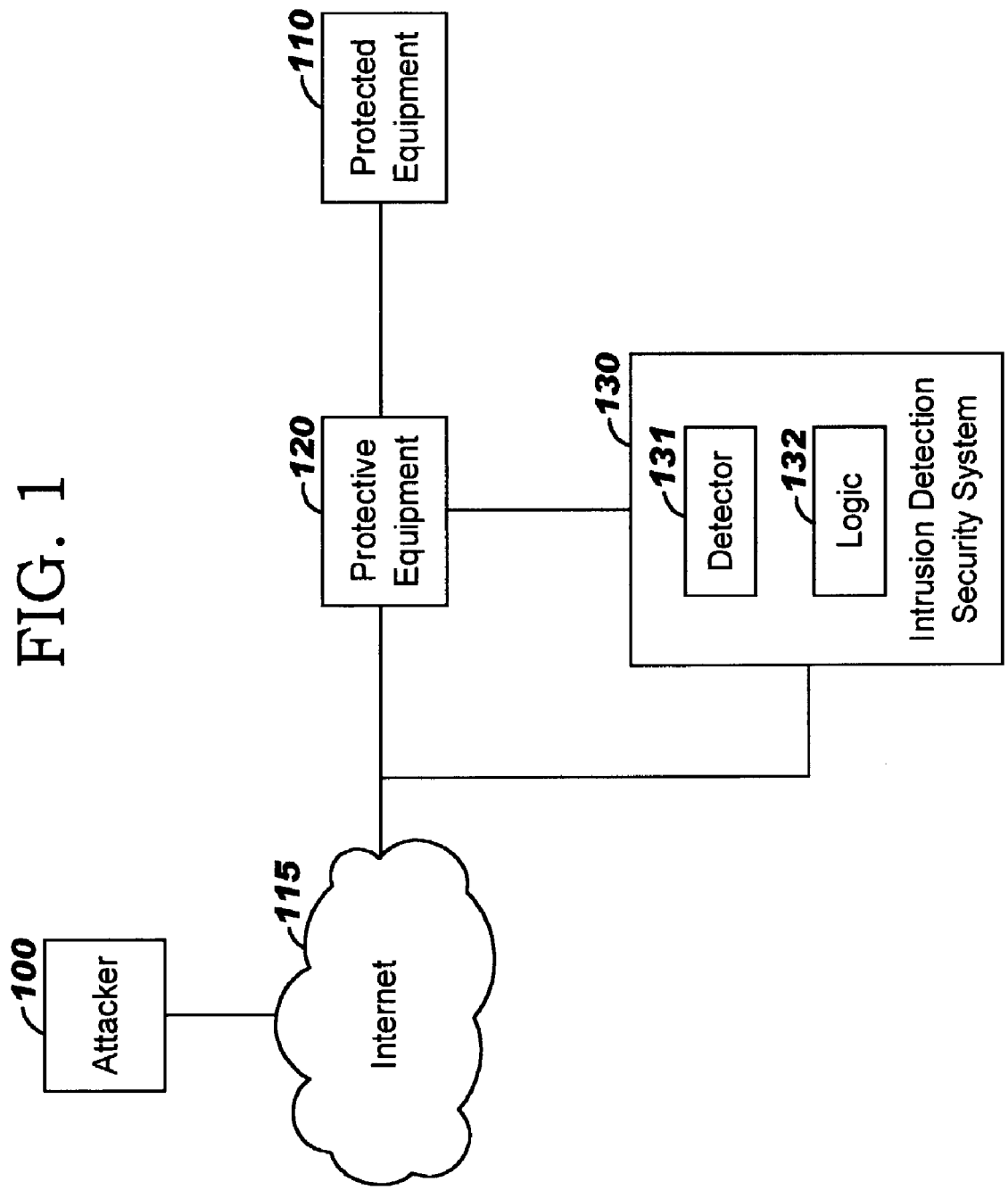
FIG. 1 is a diagram showing an exemplary context suitable for application of the present invention.

As shown in FIG. 1, a vandal or attacker 100 may attempt to inflict damage upon protected equipment 110, for example a web server or a network-connected personal computer, through the Internet 115 or another communication network. In the context of the present invention, such vandalism may include denial of service (DoS) attacks such as bandwidth attacks and connectivity attacks, distributed denial of service (DDOS) attacks, targeted common gateway interface (CGI) attacks, HTTP-based attacks, worms such as the W32.SQLExp.Worm, WWW attacks, reconnaissance activity, and so forth, all of which are generically called "network anomalies" here for descriptive convenience.

Using methods known to those skilled in the art, a detector 131 detects the presence of network anomalies by observing malicious traffic incoming to, or originating from, the protected equipment 110. Responsive to the output of the detector 131, which output at time t is denoted here as D(t), logic 132 oversees steps of the inventive method for instructing protective equipment 120 to apply, for an adaptively determined duration and then to suspend, blocking measures that guard the protected equipment 110 against network anomalies. These steps are explained in more detail below.

Here, the term "blocking measure" is to be interpreted widely as the enforcement of a defensive rule, and includes, for example, discarding, logging, or rate limiting traffic from a particular source address or set of source addresses; discarding, logging, or rate limiting traffic to a particular destination address or set of destination addresses; discarding, logging, or rate limiting UDP traffic from the Internet 115 to a particular subnet or set of subnets; discarding, logging, or rate limiting UDP traffic from the Internet 115 to a subnet with a particular UDP destination port or set of UDP destination ports; and so forth, including various combinations of the foregoing.

More generally, it is important to note that the structural details shown in FIG. 1 are illustrative rather than limiting. For example, the protective equipment 120 may be part of a router, or of a firewall, or of other suitable equipment. Either or both of the detector 131 or the logic 132 may reside within the protective equipment 120, or within an intrusion detection security system 130 as shown for convenience in FIG. 1, or may reside elsewhere in the structure of FIG. 1. The logic 132 may be dedicated hardware or a dedicated processor such as a microprocessor, or may be provided functionally by instructions executed by a processor that has other purposes as well.

Figure 2:
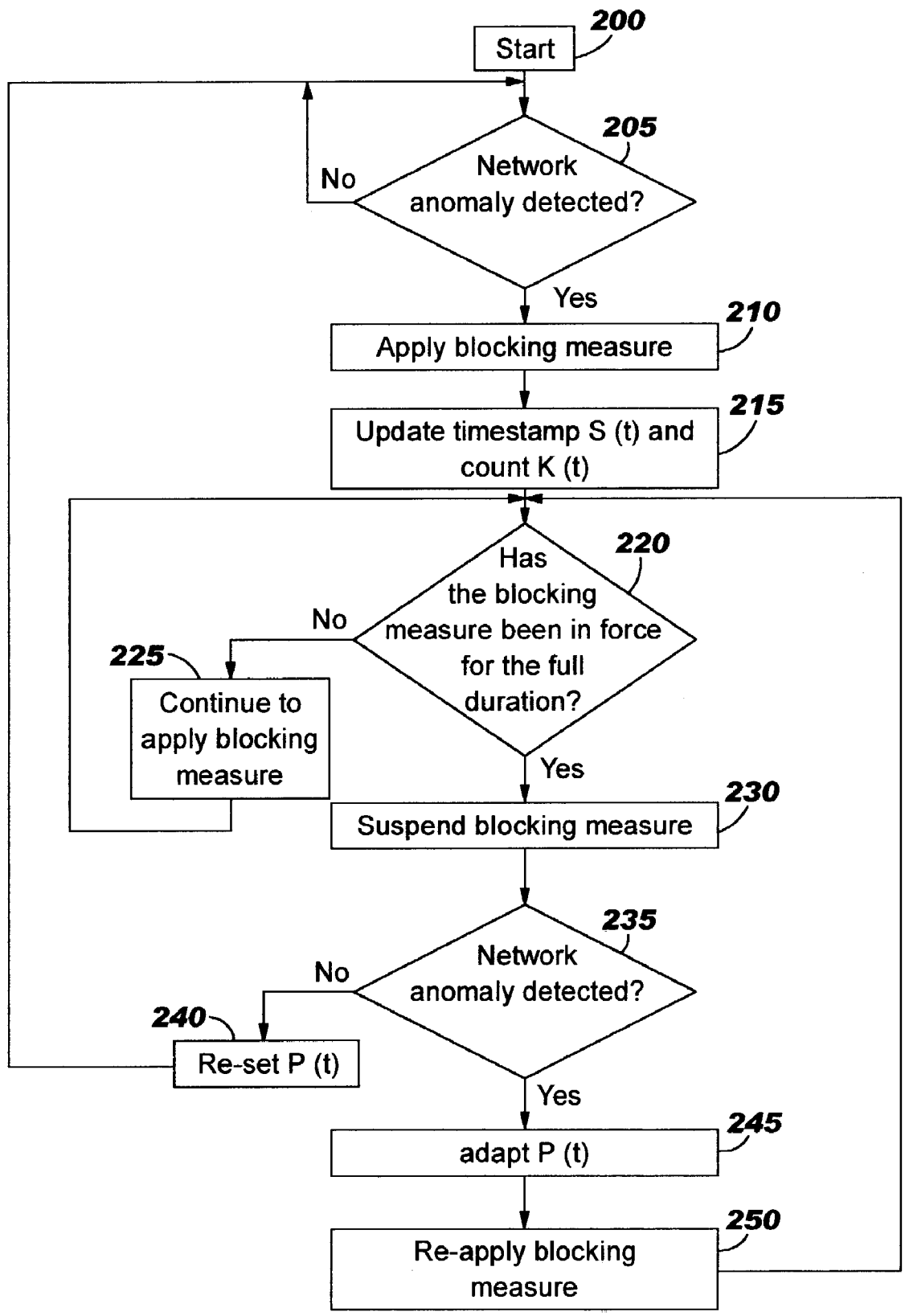
FIG. 2 is a flowchart that shows aspects of the operation of the inventive method in the context of FIG. 1.

As already mentioned, the invention includes methods for responding progressively to the detection of network anomalies by adapting the duration of blocking measures, exemplary aspects of which methods are shown in the flowchart of FIG. 2.

In a preferred embodiment of the inventive method, time is partitioned into intervals of constant length, which is denoted here as Dt. The system is updated at integer multiples of the interval Dt, that is, at the times Dt, 2Dt, 3Dt, and so forth. Let S(t) be a time stamp that indicates the absolute start time of the most recent sequence of time values with consecutive application of a blocking measure. This is an internal variable that is periodically stored, refreshed, and restored with period Dt. Let K(t) be the count of the number of times, within the present epoch of consecutive detections of network anomaly, that the blocking measure has been suspended and then re-applied in response to the detection of a persistent network anomaly. K(t) is re-set to zero when the blocking measure is suspended and the network anomaly is no longer detected. Further, Let P(t) be the duration of the blocking measure, which has an initial value $P_0$, and which is adapted to provide a progressive response, for example adapted according to a function of K(t) as explained below.

As shown in FIG. 2, the method starts (step 200) in a state of readiness, wherein the protective equipment 120 has not yet applied any blocking measures. P(t) is set to its initial value $P_0$, being a positive integer multiple of Dt, and the variables K(t) and S(t) are set to zero. The detector 131 tests for network anomalies (step 205). If no network anomaly is detected, the detector 131 continues to test (step 205). Otherwise (i.e., a network anomaly is detected), the protective equipment 120 is instructed to apply a blocking measure (step 210). The variables S(t) and K(t) are then updated (step 215). The current value of P(t), which at this point is still $P_0$, is compared (step 220) with the time lapsed since the last test for network anomalies to determine whether the blocking measure has been applied (i.e., has been in force) for the full duration. If the blocking measure has not been applied for the full duration P(t), the blocking measure is continued (step 225) while the comparison with P(t) is made again (step 220).

Otherwise (i.e., the blocking measure has been applied for the full duration P(t)), the blocking measure is suspended (step 230). In a preferred embodiment, the blocking measure is suspended for one time interval Dt, although this is not a necessary condition of the invention. The detector 131 tests again to determine whether the network anomaly is still evident (step 235). If the network anomaly is no longer evident, P(t) is reset to its initial value $P_0$ (step 240), and the method returns to the state wherein the detector 131 monitors for network anomalies (step 205).

Otherwise (i.e., an anomaly has been detected at step 235), the value of P(t) is adapted (step 245), the blocking measure is re-applied (step 250), and the method returns to the state wherein the adapted value of P(t) is compared (step 220) with the time lapsed since the last test for network anomalies.

The value of the variable P(t), which represents the duration of the blocking measure, may be adapted, for example by increasing the value according to a monotone non-decreasing function of, for example, K(t), optionally subject to a cap or maximum value or upper bound, which upper bound may be expressed as a function of K(t). In a preferred embodiment, P(t) may be increased according to $P(t)=(M^{(K(t)-1)})*P_0$, where M is a positive real number, and a maximum value of L is imposed on K(t). Preferred embodiments have used the integer values M=2 and M=8, the first of which causes the value of P(t) to double each time it increases. In other embodiments, the value of P(t) may increase in other ways, for example linearly, exponentially as a function of the value of P(t) K(t), logarithmically, randomly, asymptotically to a prescribed maximum, according to a table of pre-computed values, and so forth.

The following set of difference equations provides another way of describing aspects of the embodiment of the invention wherein the blocking measure is suspended in step 230 for a length of time Dt while the test for the anomaly is made in step 235. In these equations, let B(t) characterize the state of the blocking measure (a value of one means that the blocking measure is applied, a value of zero means that the measure is suspended). As mentioned above, let D(t) characterize the output of the detector 131 as of its last measurement (a value of one means that an anomaly is evident, a value of zero means that no anomaly is evident). Then:

$$B(t+Dt)=D(t)*(1-B(t))+(1-D(t)*(1-B(t)))*\text{if}(t+Dt-S(t)<P(t), \text{then } 1, \text{else } 0),$$

$$S(t+Dt)=B(t+Dt)*(1-B(t))*(t+Dt-S(t))+S(t), \text{ and}$$

$$K(t+Dt)=\min\{L, D(t)*(K(t)+B(t+Dt)*(1-B(t))+(1-D(t))*B(t+Dt)*(K(t)+1-B(t))\}.$$

Also note that B(t+Dt) characterizes the decision to apply the blocking measure during the time interval t,t+Dt, whereas D(t) characterizes the output of the detector 131 during the interval of time t−Dt,t.

A preferred embodiment of the invention, described above, uses time to characterize and adapt the duration of the blocking measure. Another embodiment of the invention uses a count of traffic, such as a count of packets, bits, or frames, rather than time, to characterize and adapt the duration. In such embodiments, the blocking measure is applied until, for example, the requisite number X of packets is seen by the detector 131 or otherwise sensed. In a preferred embodiment, X has the value X=1000. These kinds of embodiments may be preferred to the aforementioned time-characterized embodiments when the bandwidth of the data stream incoming to the protected equipment 110 is highly variable.

In the embodiments of the invention described so far, the inventive method is responsive to the detection of anomalies. The invention also encompasses other embodiments wherein the method responds to penetrations rather than to detections. Here, a penetration is a time step in which malicious traffic arrives when no appropriate blocking measure is active. Such embodiments may be described by a similar set of difference equations as follows.

Over the time interval t−Dt,t, an attack might or might not occur. If an attack occurs, then denote its presence at time t by A(t)=1 and hold that value for the interval t,t+Dt. If an attack does not occur, the value of A(t) is A(t)=0 over the same interval. If a blocking measure is applied over the interval t,t+Dt, then B(t)=1; otherwise B(t)=0. Define penetration N(t)=A(t)*(1−B(t)). A timestamp S(t) and the count K(t) are updated. The blocking measure is applied (held on) for the duration P(t). Then:

$$B(t+Dt)=N(t)*(1-B(t))+(1-N(t)*(1-B(t)))*\text{if}(t+Dt-S(t)<(M^{(K(t)-1)})*P_0 \text{ then } 1, \text{ else } 0),$$

$$S(t+Dt)=B(t+Dt)*(1-B(t))*(t+Dt-S(t))+S(t), \text{ and}$$

$$K(t+DT)=\min\{L,N(t)*(K(t)+1)+(1-N(t))*B(t)*K(t)\}.$$

From the foregoing description, those skilled in the art will appreciate that the present invention provides a progressive response that applies and suspends blocking measures to defend against network anomalies such as malicious network traffic, in a way that minimizes the adverse consequences of false positives and false negatives. The foregoing description is illustrative rather than limiting, however, and the scope of the present invention is limited only by the following claims.

We claim:

1. A method of responding progressively to penetrations relating to attacks occurring in time intervals during which no appropriate blocking measure is active, said method comprising:

applying a blocking measure or suspending the blocking measure in accordance with a state B(t) of the blocking measure at time t for discrete values of t which are integer multiples of a time interval Dt, said discrete values of t representing t=0, Dt, 2*Dt, ..., J*Dt, wherein J is a positive integer equal to or greater than 2;

wherein if B(t)=1 then the blocking measure is applied and if B(t)=0 then the blocking measure is suspended;

wherein A(t)=1 if an attack has occurred during a time interval Dt immediately preceding time t and A(t)=0 otherwise;

wherein N(t)=A(t)*(1−B(t));

wherein S(t) is a time stamp indicating the absolute start time of a most recent sequence of time values with consecutive application of the blocking measure;

wherein K(t) is a count of the number of times, within a present epoch of consecutive detections of network anomaly, that the blocking measure has been suspended and then re-applied in response to detection of a persistent network anomaly;

wherein P(t) is a duration of the blocking measure and is a non-decreasing function of K(t);

wherein a specified positive integer L is a maximum permitted value of K(t);

wherein t=0 is a time prior to execution of a loop of J iterations denoted as iterations 1, 2, ..., J;

wherein at t=0, B(0)=1, A(0)=1, S(0)=0, K(0)=0, and P(0)=P$_0$=I*Dt, wherein I is a positive integer;

wherein B(t), S(t), and K(t) are iteratively computed during execution of the loop such that in each iteration:

$$B(t+Dt)=N(t)*(1-B(t))+(1-N(t)*(1-B(t)))*\text{if}(t+Dt-S(t)<P(t) \text{ then } 1, \text{ else } 0),$$

$$S(t+Dt)=B(t+Dt)*(1-B(t))*(t+Dt-S(t))+S(t),$$

$$K(t+DT)=\min\{L,N(t)*(K(t)+1)+(1-N(t))*B(t)*K(t)\},$$

t=t+DT after B(t+Dt), S(t+Dt), and K(t+Dt) have been determined.

2. The method of claim 1, wherein P(t)=(M^(K(t)−1))*P$_0$ such that M is a positive real number.

3. The method of claim 1, wherein P(t) is a linear function of K(t).

4. The method of claim 1, wherein P(t) is an exponential function of K(t).

5. The method of claim 1, wherein P(t) is a logarithmic function of K(t).

6. The method of claim 1, wherein P(t) is a random function of K(t).

7. The method of claim 1, wherein P(t) is expressed as a table of pre-computed values.

8. The method of claim 1, wherein J is at least 3.

9. The method of claim 1, wherein J is at least 4.

10. A program storage device readable by a machine, embodying a program of instructions executable by the machine to perform the method of claim 1.

* * * * *